(12) United States Patent
Stretton et al.

(10) Patent No.: US 11,187,109 B2
(45) Date of Patent: Nov. 30, 2021

(54) GAS TURBINE ENGINE COWL DOORS

(71) Applicant: ROLLS-ROYCE plc, London (GB)

(72) Inventors: Richard G Stretton,
Ashby-de-la-Zouch (GB); Steven A Radomski, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 16/909,060

(22) Filed: Jun. 23, 2020

(65) Prior Publication Data
US 2021/0079810 A1     Mar. 18, 2021

(30) Foreign Application Priority Data

Jun. 26, 2019   (GB) ..................................... 1909171

(51) Int. Cl.
   *F01D 25/24*     (2006.01)
(52) U.S. Cl.
   CPC .......... *F01D 25/24* (2013.01); *F05D 2230/72* (2013.01); *F05D 2240/14* (2013.01)
(58) Field of Classification Search
   CPC ... F01D 25/24; F02K 1/72; F02K 1/52; F02K 3/06; B64D 29/02; B64D 29/08; F05D 2230/72; F05D 2240/14; Y02T 50/60
   See application file for complete search history.

(56) References Cited

U.S. PATENT DOCUMENTS

| | | | | |
|---|---|---|---|---|
| 3,541,794 A * | 11/1970 | Bollenbacher | ............ | F02K 3/06 60/226.2 |
| 4,383,347 A | 5/1983 | La Conte | | |
| 4,585,189 A * | 4/1986 | Buxton | ................... | B64D 29/08 244/129.4 |
| 4,679,750 A * | 7/1987 | Burhans | ................. | B64D 29/06 244/129.4 |
| 4,683,717 A * | 8/1987 | Naud | ..................... | B64D 29/08 60/226.1 |
| 4,920,744 A | 5/1990 | Garcia et al. | | |
| 5,350,136 A * | 9/1994 | Prosser | .................. | B64D 29/08 244/118.2 |
| 6,517,027 B1 * | 2/2003 | Abruzzese | ............. | B64D 29/06 244/127 |
| 7,275,362 B2 * | 10/2007 | Strunk | .................... | F02K 1/766 244/11 OB |

(Continued)

FOREIGN PATENT DOCUMENTS

FR     2960855 A1     12/2011

OTHER PUBLICATIONS

Nov. 11, 2020 Search Report issued in European Patent Application No. 20181478.7.

(Continued)

*Primary Examiner* — Igor Kershteyn
(74) *Attorney, Agent, or Firm* — Oliff PLC

(57) ABSTRACT

A gas turbine engine casing is described as having a cowl door hinged to a casing support structure by at least one hinge. The cowl door is openable outwardly from the casing to expose a casing interior. The hinge is located above a longitudinal axis of the casing and comprises a pivoting linkage arranged such that, upon actuation between closed and open cowl door conditions, the pivoting linkage moves an upper portion of the cowl door downwards towards the longitudinal axis.

18 Claims, 4 Drawing Sheets

(56) References Cited

U.S. PATENT DOCUMENTS

| | | | | |
|---|---|---|---|---|
| 8,800,299 B2* | 8/2014 | Provost | ............... | B64D 29/00 60/796 |
| 9,845,708 B2* | 12/2017 | Forcier | ............... | B64D 29/06 |
| 2005/0024815 A1* | 2/2005 | Pratt | ............... | B64D 29/06 361/600 |
| 2016/0031563 A1 | 2/2016 | Pautis | | |

OTHER PUBLICATIONS

Nov. 25, 2019 Search Report issued in British Patent Application No. GB1909171.9.

\* cited by examiner

GAS TURBINE ENGINE COWL DOORS

CROSS-REFERENCE TO RELATED APPLICATIONS

This specification is based upon and claims the benefit of priority from United Kingdom patent application number GB 1909171.9 filed on Jun. 26, 2019, the entire contents of which are incorporated herein by reference.

BACKGROUND

Field of the Disclosure

The present disclosure relates to gas turbine engines, such as aircraft engines, and more specifically to closures for a nacelle or casing structure of a gas turbine engine.

Background of the Disclosure

Conventional turbofan engines comprise an air intake, and a propulsive fan that generates two airflows—a core airflow and a bypass airflow. The core airflow is directed through the core of the engine to be accelerated and compressed before moving into combustion equipment where it is mixed with fuel to drive the engine's turbines and provide some propulsive thrust.

The bypass airflow downstream of the fan has an elevated velocity and bypasses the engine to provide additional propulsive thrust for the aircraft. In fact, the majority of the propulsive thrust produced by a turbofan engine is provided as a result of the bypass airflow. The ratio of the air that bypasses the engine to the air that goes through the core of the engine is commonly defined as the bypass ratio.

The fuel flow rate for the engine core is increased as a result of the fan being present, since fuel is being burned to drive the turbines which in turn drive the fan itself. However, this increase is only small relative to the additional propulsive thrust provided by the fan and the resultant bypass flow.

The turbofan engine is therefore very fuel efficient, and it is desirable, for obvious reasons, to increase the bypass ratio so as to increase the fuel efficiency. One known way of doing so is to increase the diameter of the propulsive fan. By doing so, the airflow generated by the fan, and therefore the bypass airflow generated by the fan, is increased.

However, increasing the diameter of the propulsive fan and associated nacelle is not straightforward. The nacelle size and position are carefully chosen to meet installed aerodynamic requirements as well as physical installation constraints.

For aerodynamic considerations, the gap between the nacelle and wing, also referred to as the "gully region", needs to be carefully designed. If this gap is reduced too much (e.g. by installing a larger nacelle), this can cause a local acceleration of the flow, up to a speed at which shock waves form with a rapid increase in installed drag.

For physical installation considerations, the nacelle needs to be positioned with sufficient clearance to the wing to accommodate any wing leading edge flap deployment, thrust reverser deployment during landing, and thrust reverser outer cowl hinged opening for engine maintenance activities.

Typically, installing a larger nacelle under the wing would be restricted by one or all of these installed considerations.

This is particularly true since an additional blister fairing, also referred to as a "beaver tail" is typically required at the rear end of the nacelle in order to enclose conventional nacelle door hinge connections which are necessary throughout the axial length of the nacelle in the upper region.

This is demonstrated by FIG. 4, which illustrates a schematic longitudinal section though the exhaust nozzle region a conventional gas turbine engine. The outer nacelle 21 need only be of minimal/tapering height for structural and/or aerodynamic reasons. However, as a result of the height of the hinged connections 50, a beaver tail 55 (indicated by the dashed line) is required. The beaver tail 55 causes a shelf-like protrusion of increased height in the vicinity of the pylon, i.e. on either side of the pylon, to support. This increases the diameter of the upper nacelle 21, thus reducing the clearance between the upper nacelle 21 and the aircraft wing, and restricting the fan diameter and nacelle size that can be installed under-wing.

It is therefore an aim of the present disclosure to mitigate or overcome at least some of the abovementioned and/or other disadvantages associated with the prior art. It may be an additional or alternative aim to provide cowl doors for a gas turbine engine or nacelle that better accommodate a large diameter propulsive fan and/or bypass passage.

SUMMARY OF THE DISCLOSURE

According to a first aspect there is provided a gas turbine engine casing comprising a cowl door, the cowl door hinged to a casing support structure by at least one hinge structure and openable outwardly from the casing to expose a casing interior, wherein the hinge structure is located above a longitudinal axis of the casing and comprises a pivoting linkage arranged such that upon actuation between closed and open cowl door conditions the pivoting linkage lowers the cowl door downwards towards the longitudinal axis.

According to a second aspect, there is provided a gas turbine engine comprising the casing of the first aspect.

The pivoting linkage may extend across opposing edges or faces of cowl door and the casing support structure, e.g. across an interface between the cowl door and casing support structure in the closed condition. The pivoting linkage may connect to an upper/top part of the cowl door and may move the top/upper part of the cowl door away from an adjacent aircraft structure, such as a wing.

The casing may comprise a nacelle.

The casing support structure may comprise a pylon for supporting the gas turbine engine, e.g. beneath an aircraft wing.

The casing may comprise two cowl doors hinged to opposing sides of the engine casing, e.g. with respect to the longitudinal axis. The two doors may be hinged to the engine casing support structure by different/opposing hinge structures.

The pivoting linkage may comprise a plurality of links pivotably connected by pivot points, e.g. floating and/or intermediate pivot points.

The pivoting linkage may comprise four links, e.g. pivotably connected by four pivot points. A first pivot point may be on the casing support structure. A second pivot point may be on the cowl door. A third and/or fourth pivot point may comprise a floating and/or intermediate pivot point, e.g. between two links.

Upon actuation of the door, at least one of the pivot points being released from the engine casing member such that the at least one door can move vertically downwards relative to the hinge point.

Actuation of the at least one cowl door may be caused by mechanical actuation, e.g. an actuator.

A plurality of cowl doors, e.g. opposing cowl doors, may be connected by a rod, e.g. spanning a width of the engine casing support structure. The rod may connect upper ends or edges of the cowl doors.

The cowl door may move downwards relative to one or more pivot point before opening outwardly from the engine casing.

At least one hinge structures of a first kind may be located towards a front end/edge of the cowl door and at least one hinge structures of a second kind may be located towards a rear end of the cowl door. The hinge structures of the first and second kind may be axially spaced.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft. In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 260 cm (around 100 inches), 270 cm, 280 cm (around 105 inches), 290 cm (around 110 inches), 2100 cm (around 115 inches), 300 cm (around 120 inches), 310 cm, 320 cm (around 125 inches), 330 cm (around 130 inches), 340 cm (around 135 inches), 360 cm, 370 cm (around 140 inches), 380 cm (around 145 inches), 390 (around 160 inches) cm or 3100 cm (around 165 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2600 rpm, for example less than 2300 rpm. Purely by way of further non-limitative example, the rotational speed of the fan at cruise conditions for an engine having a fan diameter in the range of from 260 cm to 300 cm (for example 260 cm to 290 cm) may be in the range of from 1800 rpm to 2600 rpm, for example in the range of from 1900 rpm to 2300 rpm, for example in the range of from 11000 rpm to 2100 rpm. Purely by way of further non-limitative example, the rotational speed of the fan at cruise conditions for an engine having a fan diameter in the range of from 320 cm to 390 cm may be in the range of from 1200 rpm to 2000 rpm, for example in the range of from 1300 rpm to 1900 rpm, for example in the range of from 1400 rpm to 1700 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 60, 65, 70, 75, 80, 85. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 100 $Nkg^{-1}$ s, 95 $Nkg^{-1}$ s or 90 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 170 kN, 180 kN, 190 kN, 1100 kN, 200 kN, 260 kN, 300 kN, 360 kN, 400 kN, 460 kN, 600 kN, or 660 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1460 K, 1600 K, 1660 K, 1700 K or 1760 K. The TET at cruise may be in an inclusive range bounded by any two of the values in the previous sentence (i.e. the values may form upper or lower bounds). The maximum TET in use of the engine may be, for example, at least (or on the order of) any of the following: 1800 K, 1860 K, 1900 K, 1960 K, 11000 K, 1960 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc).

Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.85 to 0.95, for example 0.76 to 0.84, for example 0.77 to 0.83, for example 0.78 to 0.82, for example 0.79 to 0.81, for example on the order of Mach 0.8, on the order of Mach 0.95 or in the range of from 0.8 to 0.95. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 16000 m, for example in the range of from 10000 m to 12000 m, for example in the range of from 10400 m to 11700 m (around 39000 ft), for example in the range of from 10600 m to 11600 m, for example in the range of from 10700 m to 11400 m, for example in the range of from 10800 m (around 36000 ft) to 11300 m, for example in the range of from 10900 m to 11200 m, for example in the range of from 101000 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −65 degrees C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
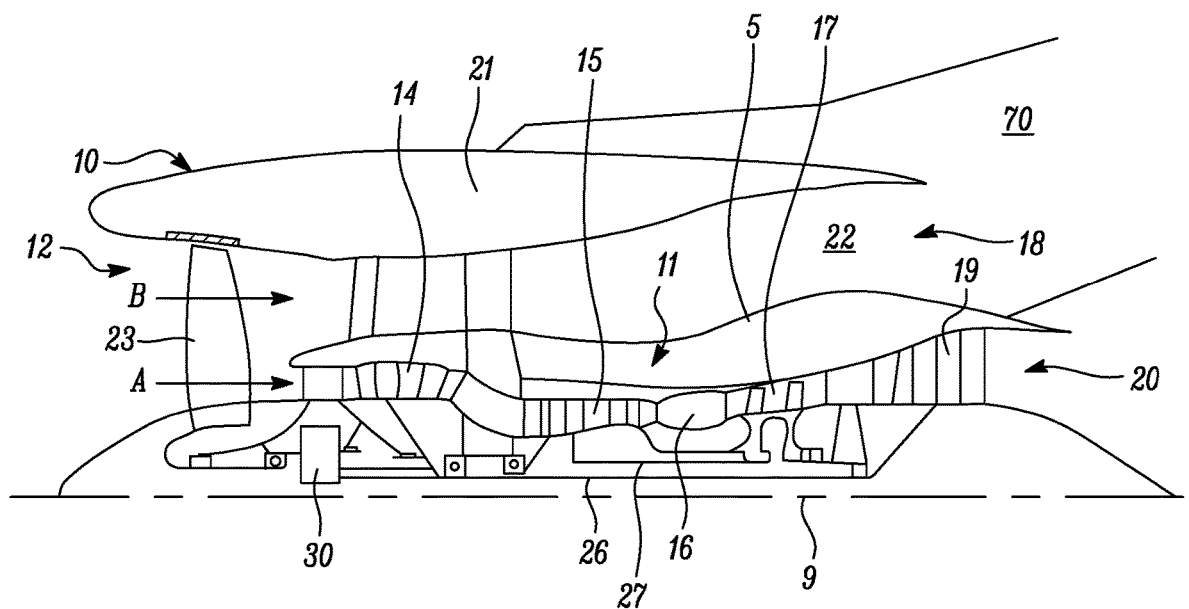
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20.

An engine casing 5 is annular in form and surrounds the engine core 11. The casing 5 may be referred to herein as an inner cowl. A nacelle 21 surrounds the gas turbine engine 10, i.e. being radially outside the propulsive fan 23, and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

The nacelle may be referred to herein as an outer cowl or casing. A cowl/casing comprises cowl doors of the type described herein for opening the cowl/casing to allow access to its interior.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
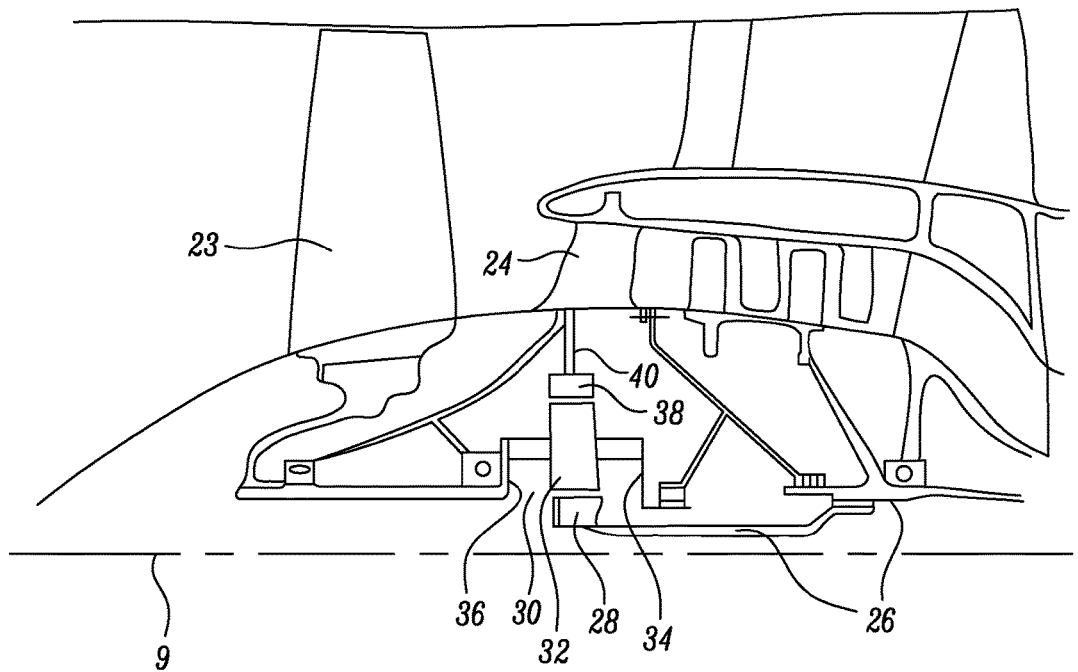
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
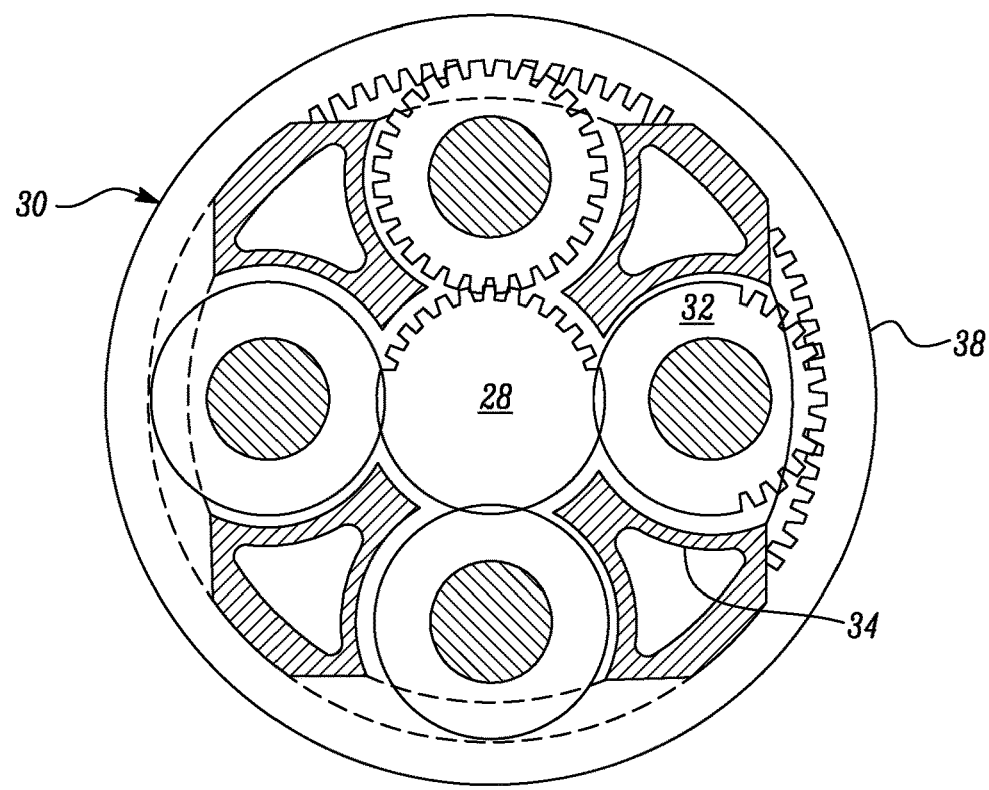
FIG. 3 is a partially cut-away view of a gearbox for a gas turbine engine.
Figure 4:
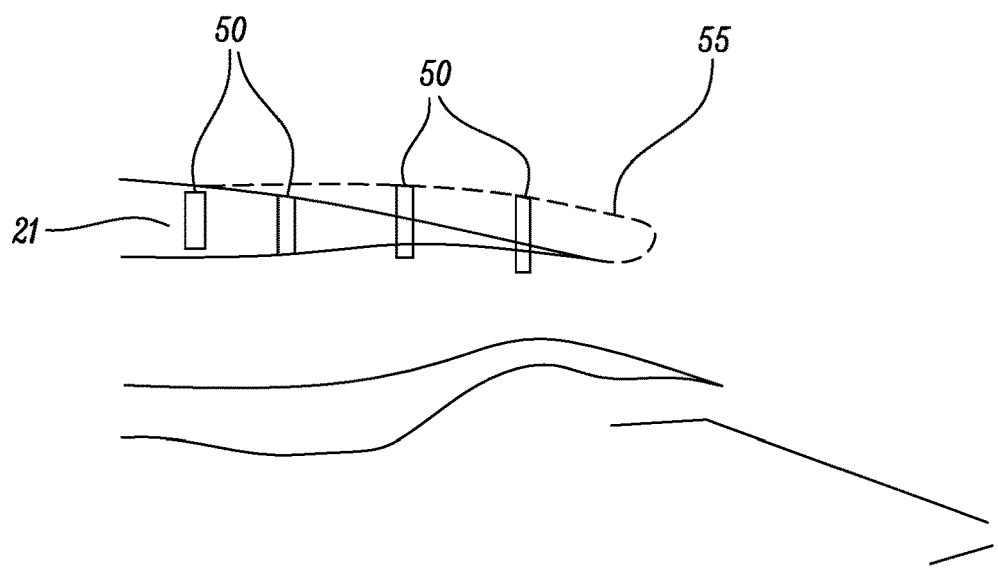
FIG. 4 is a schematic longitudinal section view of a conventional gas turbine engine bypass duct exhaust nozzle region known in the state of the art.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

A pylon 70 provides a fixed/static support structure for the nacelle 21 and engine core 11, including the engine casing 5. The pylon 70 typically holds the engine 10 beneath an aircraft wing (not shown) and thus forms part of the airframe. The cowl doors of the nacelle 21 are hingedly mounted to the pylon 70 at an upper edge thereof, i.e. at a height above the engine axis 9, such that the cowl doors can swing between open and closed conditions.

The present disclosure relates particularly to the nacelle 21 of the gas turbine engine 10, and the manner in which the nacelle/cowl doors 65 (shown in FIG. 5) are hinged to the pylon 70 and/or the remainder of the nacelle 21 to allow access to the internal components of the nacelle 21 and/or interior of the gas turbine engine 10 more generally.

Figure 5:
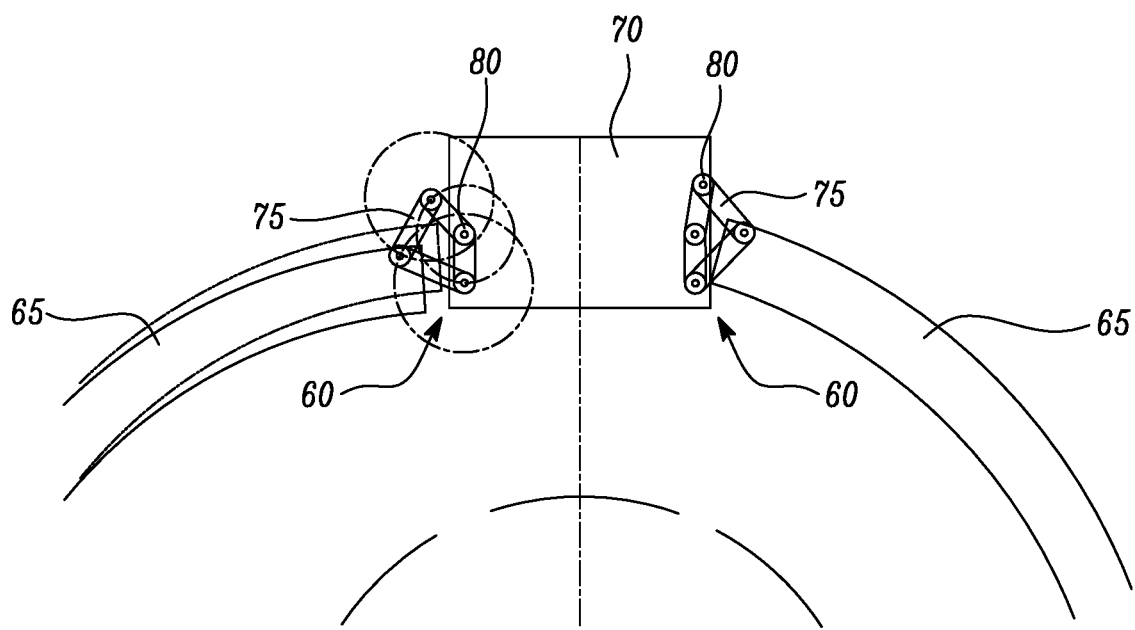
FIG. 5 is a cross-sectional view of a gas turbine engine cowl door hinge structure according to an example of the disclosure.

FIG. 5 illustrates a pair of opposing hinge structures 60 according to an example of the present disclosure, when viewed along the rotational axis 9 of the gas turbine engine 10. Each hinge structure 60 physically connects a nacelle door 65 to a portion of the pylon structure 70 that runs axially along a portion of the length of the top of the gas turbine engine 10, e.g. top dead centre of the engine.

The cowl doors 65 are curved in form, i.e. with opposing right-hand and left-had cowl doors being opposingly curved so that the pair of doors together define a generally annular casing structure substantially centred around the engine axis 9. The cowl doors 65 have an axial length that is less than the length of the nacelle 21 such that the cowl doors define only a portion of the nacelle. The doors 65 thus open relative to the remaining, or fixed, portion of the nacelle 21.

In this embodiment, the nacelle doors 65 comprise a conventional d-duct arrangement. However, in other embodiments it is anticipated that the hinge structures could be applicable to any hinged outer cowl, hinged from the pylon structure 70.

Each hinge structure 60 comprises a four-member linkage structure, e.g. formed into a four-sided polygon of variable shape as the linkages pivot relative to each other about the pivot points. Each of the four members 75 is connected at each of its ends to another member 75 via a pivot point 80 such that each of the four members 75 is rotatable at each of its ends and is therefore rotatable relative to its two connected members 75, facilitating the variable shape of the polygon.

A fixed pivot point 80 is provided on the pylon structure 70. Two links members 75 depend therefrom. A further pivot point is provided on the cowl door 65, i.e. at a location adjacent the pylon 70. A further two link members 75 depend therefrom. The two further link members meet the opposing link members at intermediate pivot points so as to form a closed linkage structure 60 connecting the door 65, e.g. an upper edge of the door, to the pylon. At least one of the intermediate pivot points is floating, i.e. not permanently fixed to the pylon or cowl door. It is possible that both intermediate pivot points are floating, or else that one intermediate pivot point is fixed to the pylon or door.

The right-hand side of the drawing indicates the arrangement of the hinge structure 60 in a first configuration, during normal use of the gas turbine engine, ie when the nacelle doors 65 are closed. In the first configuration, the hinge structure 60 is arranged such that the link members 75 depending from the first pivot point 80 that is physically attached to the pylon structure 70 are substantially aligned. This means that the door edge is pulled close to the pylon 70 when closed. The linkage structure is approximately triangular in this condition as can be seen on the right-hand side of FIG. 5. In this configuration, the nacelle door 65, i.e. the upper edge thereof, is positioned at a first vertical height relative to the gas turbine engine axis and the pylon structure 70.

The left-hand side of the drawing indicates the arrangement of the hinge structure 60 in a second configuration, during an opening event, ie when the nacelle doors 65 are required to be open but have not yet been swung outwards to provide access to the interior of the nacelle. In the second configuration, one of the intermediate pivot points 80 is moved away from the pylon structure 70 such that each link member of the hinge structure 60 is obliquely or perpendicularly angled relative to its adjacent link members. This allows the pivot point 80 attached to the cowl door 86 to be lowered relative to the fixed pivot point(s) 80 on the pylon during an opening action.

When in the closed condition, the floating intermediate pivot point 80 could be releasably held on the pylon. Thus, two or three of the pivot points may be attached to the pylon 70 to hold the closed condition. The floating/releasable pivot point 80 allows the downward movement of the cowl door 65 during opening such that one or two pivot points 80 of the hinge structure remain physically affixed/retained on the pylon when the door 65 is opened.

The releasable pivot point 80 could be released from connection with the pylon structure 70 by a mechanical actuator which drives the hinge structure 60 between an open and closed position. Alternatively, if the intermediate/floating pivot point is not releasably attached to the pylon, the mechanical actuator could simple urge the door downward/open.

As a result of the intermediate pivot point 80, the opening kinematics of the nacelle door 65 are altered such that the initial movement of the nacelle door 65 is vertically downwards to a second vertical height, the second vertical height being lower than the first vertical height relative to the gas turbine engine axis 9 and the pylon structure 70. The direction of initial movement of the hinge structure may thus be in a direction that is generally vertical and/or perpendicular to axis 9, i.e. prior to, or during, swinging of the doors outward/away from the engine into a fully open condition. The initial movement could otherwise be in the direction of a downward arc.

In use, when inspection/maintenance of the internal components of the gas turbine engine is required, the uppermost pivot point 80 of each hinge structure is released from connection with the pylon structure 70 by the mechanical actuator, allowing rotation of the link members 75 such that the nacelle doors 65 drop and also swing outwards relative to the pylon structure 70. This motion is chosen so that the upper corners of the d-duct v-blade follow the locus of the inner/outer v-grooves. The nacelle doors 65 may then be opened from the bottom of the engine casing, i.e. the lower edge of the doors 65, where the doors 65 are releasably connected via a conventional latching mechanism to the fixed portion of the nacelle.

Figure 6:
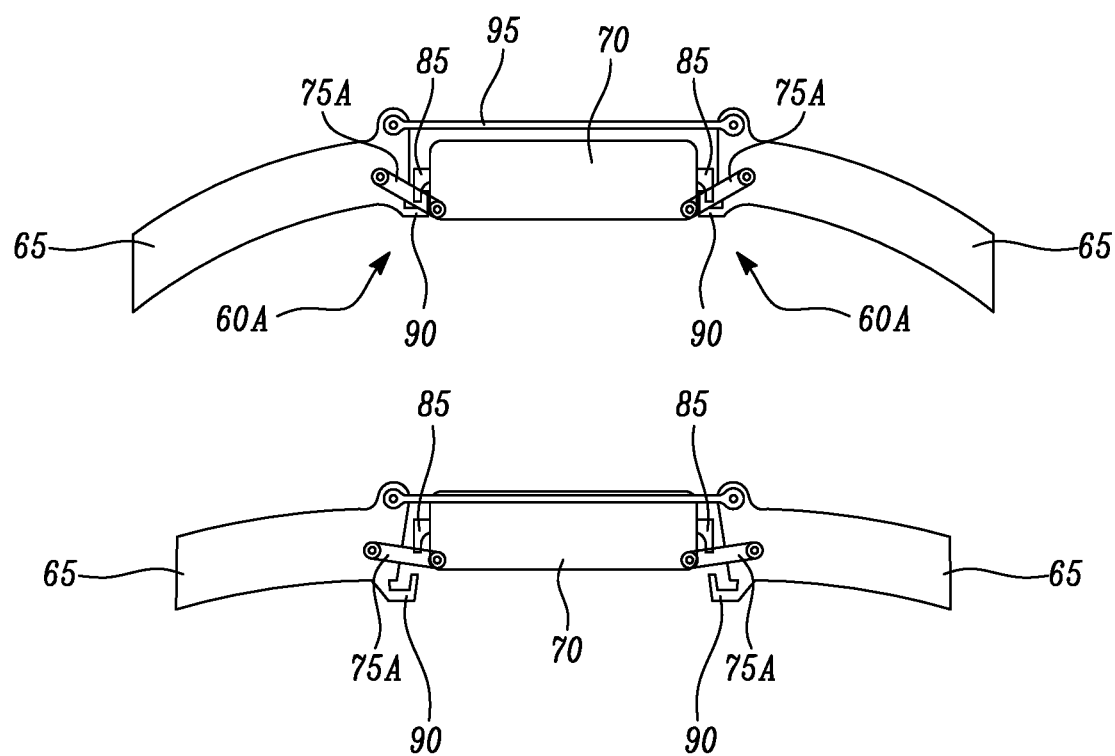
FIG. 6 shows cross-sectional views of a further cowl door hinge structure in closed and open conditions.

FIG. 6 illustrates a further pair of opposing hinge structures 60A that may also be used. In FIG. 6, it can be seen that the pylon structure 70 further comprises hooks 85 at either side, the hooks 85 configured to engage with corresponding/opposing hooks 90 positioned on the nacelle doors 65. The hooks are engaged in the closed condition but can be disengaged during the lowering action of the doors 65. Each hook therefore extends in a vertical or upright direction towards its free end, e.g. with one hook extending upwards and the other in the opposing direction, i.e. downwards.

A single link member 75A is shown for each hinge 60A, extending between pivot points on each of the pylon 70 and adjacent door 65.

The nacelle doors 65 are also further physically connected to one another in this example via a connecting rod 95 that spans the width of the pylon structure 70, the connecting rod 95 being rotatably/pivotably connected to a nacelle door 65 at each of its ends. The connecting rod 95 is of fixed length and can ensure uniform operation of the pivoting linkages 75A on either side of the pylon.

Figure 7:
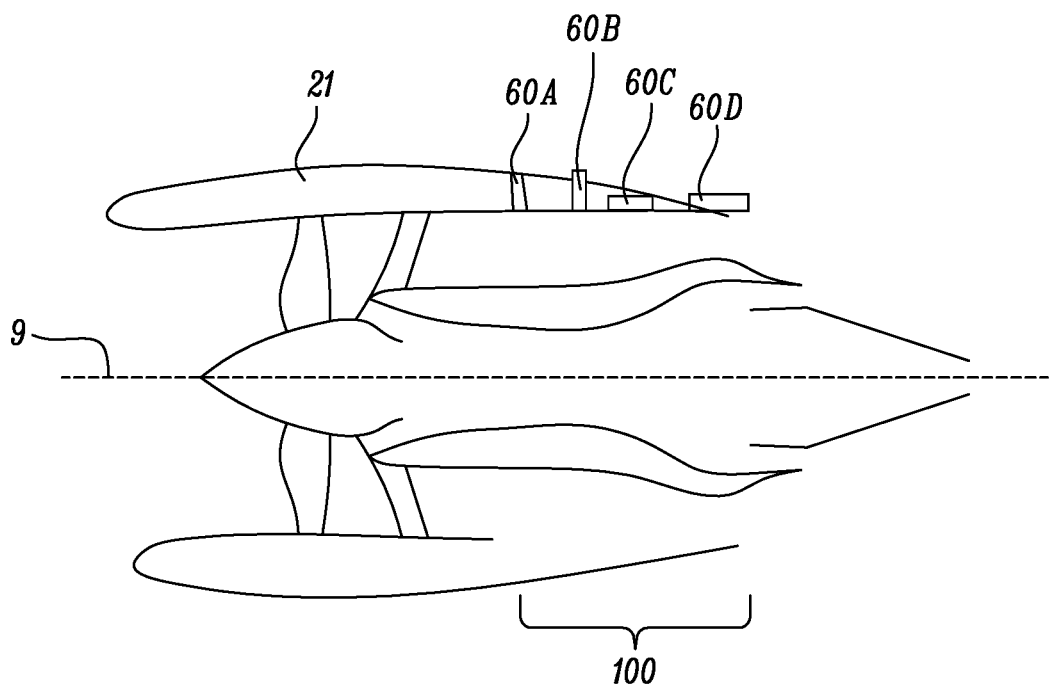
FIG. 7 is a schematic longitudinal section view of a gas turbine engine illustrating the positions of a series of the hinged structures in an example of the disclosure; and, FIG. 8 shows cross-sectional views of a further cowl door hinge structure in a closed condition.

The hinge structures 60A with hook connections formed by hooks 85, 90 can be located at different axial locations along the longitudinal axis 9 of the gas turbine engine 10 compared with the hinge structure 60, as is best shown in FIG. 7. That is to say, a single cowl door 65 will typically be supported by a plurality of hinges spaced along its axial length, and the hinge structures may take different forms. A combination of the different hinge types 60 and 60A can be employed on a single door. Conversely, the different hinge structures 60 and 60A could be used as alternatives, rather than in parallel.

The top part of FIG. 6 indicates the arrangement of the hinge structure 60A in a first configuration, during normal use of the gas turbine engine, ie when the nacelle doors 65 are closed. In the first configuration, the hinge structure 60A is laterally restrained relative to the pylon structure 70 via the engagement of the hook 90. This provides additional mechanical strength to the hoop connection between the doors and pylon when closed. The lateral movement is further constrained by the connecting rod 95, which is of fixed length, thereby preventing movement of the doors apart.

In this configuration, the hooks 85 of the pylon structure 70 and the hooks 90 of the nacelle doors 65 are engaged, and the nacelle doors 65 are positioned at a first vertical height relative to the gas turbine engine. The orientation of the hooks and the fixed length of the rod 95, means that the doors 65 must first move downward before they can open outward.

The bottom part of FIG. 6 indicates the arrangement of the hinge structure 60A in a second configuration, with the doors open to allow access to the nacelle interior. In the second configuration, the doors 65 have moved downward to disengage the hooks such that the doors can now pivot relative to the rod 95 and the pivoting link member 75A, i.e. relative to the pivot points thereof. In this manner, the combination of the pivoting link members 75A and the connecting rod 95, in combination with the pylon 70, act as a linkage structure supporting the upper end of the doors and permitting controlled rotation thereof into the open condition.

The angular orientation of the link members 75A varies between the closed and open conditions, e.g. during lowering of the doors and/or during pivoting of the doors outward. That is to say the link members pivot relative to the pylon 70.

The orientation of the connecting rod 95 stays substantially constant such that the rod is translated up and down during closing/opening procedures. This helps to ensure uniform movement of both cowl doors in unison.

The mechanism and hook arrangement of FIG. 6 allows an opening motion similar to that of the hinge structure of FIG. 5, i.e. by way of a downward movement, followed by a pivoting movement of the doors.

Once maintenance of the internal components of the gas turbine engine is complete, the nacelle doors 65 can be closed, forcing the connecting rod 95 upwards to its previous position and the re-engagement of the hooks to hold the hinge structure 60A back in the first configuration.

The whole of the opening and closing processes described in relation to FIGS. 5 and 6 is preferably manually actuated. However, a powered actuator could be used for the release and or re-closing of the doors, e.g. the initial release and/or final movement in an upwards/downwards direction.

Whilst the opening and closing motion of the hinge structures of FIGS. 5 and 6 is comparable, the arrangement of FIG. 6 allows the hinge structure to be accommodated in an envelope of reduced height.

FIG. 7 illustrates the positioning of the hinge structures 60A, 60B, 60C and 60D along the longitudinal axis of the outer nacelle 21 and/or the main axis 9 of the engine as a whole. The locations of the hinge structures will be hereby referred to as forward locations 60A, 60B and rear locations 60C, 60D. As can be seen from FIG. 7, the hinge structures 60A, 60B are applied at the front end of the aft nacelle 21, i.e. the fore of the doors. In this location, the internal height of the nacelle 21 is sufficient to accommodate the height of the hinge structures 60 without modification.

The hook and hinge arrangement of FIG. 6 can be used at the forward locations 60A, 60B, and sometimes at the rear location 60C, where there is sufficient depth within the nacelle aerodynamic lines to accommodate the mechanism. The dual hook and hinge mechanism provides a redundant failsafe load path to protect against a possible failure of a hinge element.

At the rear locations 60C, 60D, it is desirable to have only low profile features to avoid the beaver tails. At these locations, only the hook is required. The connection of the outer hinged doors to the pylon structure could also be supplemented by a low profile latch or pin arrangement if required.

Reduction/elimination of the beaver tails may be made possible by removing the conventional hinges from the rear part of the nacelle. Additionally or alternatively, the track slider for TRU deployment may be relocated to the forward part of the nacelle over the fancase (e.g. by means of a translating cascade TRU).

The hinge structures 60 provide a strong enough linkage to hold the doors firmly in the open condition that the strength of the rear hinge structures 60A in the open condition is less critical. For this reason, the hook connections 85, 90 of the hinge structures 60A are sufficient for holding the nacelle doors 65 to the pylon structure 70 at the back end of the aft nacelle 100 in the closed condition but can be allowed to disengage when opened. The secure holding of the doors in the closed condition, i.e. by the hooks, is important since this is the normal/in-use condition for the engine for which the structural and aerodynamic positioning of the doors is important.

The revised profile, i.e. reduced height, of the rear hinges 60A is enabled, at least in part, by the disengagement of alignment/retaining features between the closed and open conditions, which in the examples disclosed herein comprise hooks, but could otherwise comprise other forms of retaining or latching members.

In the above description, the front/fore and back/rear end refer to the direction of forward travel of the gas turbine engine in use and/or the direction of airflow through the engine.

The axial position of the forward hinge locations 60A, 60B may be deliberately chosen so as to straddle the centre of gravity of the aft nacelle.

The designs disclosed herein could be applicable to either a conventional d-duct arrangement hinged from the pylon, or any hinged outer aft nacelle doors. The designs could equally apply to direct drive or geared turbofan engine architectures. However, the hinge structures described herein are well-suited to larger fan diameter engines, which may occur due to the use of a geared turbofan architecture, for example which may need to be accommodated with installation/height constraints beneath an aircraft wing.

It will be understood from the above description that the connecting rod 95 between the nacelle doors 65 may or may not be implemented, dependent on the desired opening kinematics, and may only be required at the forward hinged locations 60.

Figure 8:
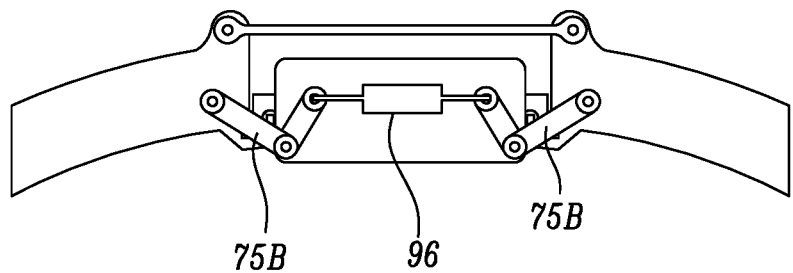

It is foreseen that the opposing hinge structures 60 may be connected to one another in other example hinge structures, for example as shown in FIG. 8. In this example, the link members 75B are elbow-like or L-shaped in form, e.g. taking the form of geared bell cranks. The link members 75B are pivoted about the vertex or elbow such that the free ends of each link member 75B can be joined by an intermediate member 96, i.e. at a location spaced from the pivot point. This connection may in addition to or instead of the connecting rod 95 between the nacelle doors 65.

The intermediate member 96 in this example is extendable/retractable, i.e. being length adjustable to accommodate the varying spacing between the opposing free ends of the link members 75B. The intermediate member 96 could be resiliently biased, e.g. towards the open or closed condition.

It is also foreseen that where a connecting rod 95 is implemented, a remote operated latch, such as a solenoid, could also be deployed onto the connecting rod 95 to releasably lock the connecting rod 95 in place. The latch may prevent the nacelle doors 65 from moving in the event of failure of the mechanical actuator or mechanism for operating the opening and/or closing of the nacelle doors 65. This feature could be used to maintain the nacelle doors 65 in the open or closed position when the hinge structure 60 is in the second or first configuration respectively.

The present disclosure and its features as described herein may provide some or all of the following advantages.

The allowance for an increase in the diameter across the whole of the nacelle may allow for a larger fan diameter (and therefore a higher bypass ratio) to be installed under the wing, without compromising the aerodynamic characteristics, cowl opening access requirements or restricting deployment of the TRU. In fact, it is estimated that the present disclosure could allow for an increase of up to four inches in fan diameter.

The present disclosure may provide an alternative load path for connecting the nacelle doors together, thereby allowing the number of hinges required to withstand the nacelle internal gas loads to be reduced.

The present disclosure may allow for the removal or reduction of the beaver tail fairing at the back end of the nacelle, thereby reducing the diameter of the nacelle and improving nacelle to wing clearances, resulting in either improved aerodynamic properties or allowing for an increase in the diameter across the whole of the nacelle.

The present disclosure may allow for the removal of the rod features required to hold the nacelle doors open, thus freeing space in the core of the aircraft for alternative features or systems.

The present disclosure may allow for the better balancing of the two d-duct nacelle doors, thus allowing for a reduction in the size and weight of the nacelle doors opening system.

The present disclosure may be retrofittable to any engine within the constraints of existing standard airframe installation constraints.

The present disclosure may be applicable to both conventional d-duct arrangements hinged from the pylon structure, or any hinged nacelle cowls, as well as both direct drive and geared turbofan engines.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, it will be appreciated that although the introduction of this application suggests that the hinged cowl door according to the present disclosure is hinged to an underwing pylon structure, the hinged cowl door arrangement described herein is just as applicable to an over-wing pylon structure or a rear fuselage pylon structure.

It will also be understood that the fan cowl opening and interlocking system is no different for an operator than that of a conventional "D" duct arrangement. The inner vee grove (IVG) and outer vee groove (OVG) stop the hooks disengaging, thereby restraining vertical movement when the doors are fully closed and locked together. An additional safety interlock could be installed by having a device to prevent the previously described intermediate member 96 from changing in length.

We claim:

1. A gas turbine engine casing comprising a cowl door, the cowl door hinged to a casing support structure by at least one hinge structure and openable outwardly from the casing to expose a casing interior,
   wherein the hinge structure is located above a longitudinal axis of the casing and comprises a pivoting linkage arranged such that upon actuation between closed and open cowl door conditions the pivoting linkage moves the cowl door downwards relative to the longitudinal axis,
   the pivoting linkage comprises a first pivot point on the casing support structure and a second pivot point on the cowl door, the pivoting linkage spanning the first and second pivot points, and
   at least one of (i) the second pivot point is lowered relative to the first pivot point when moving from the closed to the open condition and (ii) a height of the second pivot point above the longitudinal axis is greater than or equal to a height of the first pivot point in the closed condition.

2. The gas turbine engine casing according to claim 1, wherein the pivoting linkage lowers a portion of the cowl door that is adjacent the casing support structure and connected thereto by the pivoting linkage.

3. The gas turbine engine casing according to claim 1, wherein the height of the first pivot point above the longitudinal axis is fixed and the height of the second pivot point above the longitudinal axis varies relative to the first pivot point between the closed and open conditions.

4. The gas turbine engine casing according to claim 1, wherein the pivoting linkage comprises a plurality of links joining the first pivot point to the second pivot point, the plurality of arms comprising an intermediate or floating pivot point in the force path between the first and second pivot points.

5. The gas turbine engine casing according to claim 4, wherein the pivoting linkage comprises four links and/or four pivot points.

6. The gas turbine engine casing according to claim 1, wherein the pivoting linkage is obliquely angled relative to a vertical axis in the closed condition.

7. The gas turbine engine casing according to claim 1, wherein the pivoting linkage pivots about an axis that is substantially parallel with the longitudinal axis between the open and closed conditions.

8. The gas turbine engine casing according to claim 1, wherein the hinge structure comprises a plurality of pivoting linkages comprising a left-hand pivoting linkage and a right-hand pivoting linkage with respect to the longitudinal axis, the left-hand pivoting linkage being connected between the casing support structure and a left-hand cowl door, and the right-hand pivoting linkage being connected between the casing support structure and a right-hand cowl door.

9. The gas turbine engine casing according to claim 8, wherein the left-hand and right-hand pivoting linkages or cowl doors are independently actuatable between the closed and open conditions.

10. The gas turbine engine casing according to claim 8, wherein the left-hand and right-hand pivoting linkages or cowl doors are joined by an intermediate limb arranged to communicate movement between said pivoting linkages or doors.

11. The gas turbine engine casing according to claim 10, wherein the intermediate limb is pivotably connected to each or the left-hand and right-hand linkages or cowl doors and moveable in unison therewith.

12. The gas turbine engine casing according to claim 1, wherein the cowl door is hinged to the casing support structure by a plurality of said hinge structures spaced apart in a direction of the longitudinal axis.

13. The gas turbine engine casing according to claim 12, wherein one or more of said plurality of hinge structures comprises a hook on one of the casing support structure and the cowl door arranged to engage with a retaining formation on the other of the casing support structure and the cowl door in the closed condition, wherein the hook is disengageble from the retaining formation during actuation between the closed and open conditions.

14. The gas turbine engine casing according to claim 13, wherein the hook is arranged to disengage from the retaining formation by the lowering of the cowl door on the pivoting linkage.

15. The gas turbine engine casing according to claim 13, wherein said hinge structure comprising said hook is located axially rearward of a further hinge structure and/or axially rearmost of the plurality of hinge structures.

16. The gas turbine engine casing according to claim 13, wherein the retaining formation on the other of the casing support structure and the cowl door comprises an opposing hook.

17. A gas turbine engine for an aircraft comprising:
   an engine core comprising a turbine, a compressor, and a core shaft connecting the turbine to the compressor;
   a fan located upstream of the engine core, the fan comprising a plurality of fan blades; and
   a gearbox that receives an input from the core shaft and outputs drive to the fan so as to drive the fan at a lower rotational speed than the core shaft,
   wherein the gas turbine engine further comprise an engine casing according to claim 1, and a gas turbine engine casing according to claim 1.

18. The gas turbine engine according to claim 17, wherein:
   the turbine is a first turbine, the compressor is a first compressor, and the core shaft is a first core shaft;
   the engine core further comprises a second turbine, a second compressor, and a second core shaft connecting the second turbine to the second compressor; and
   the second turbine, second compressor, and second core shaft are arranged to rotate at a higher rotational speed than the first core shaft.

\* \* \* \* \*